(12) United States Patent
Baek et al.

(10) Patent No.: US 11,605,889 B2
(45) Date of Patent: Mar. 14, 2023

(54) COMBO ANTENNA MODULE

(71) Applicant: AMOTECH CO., LTD., Incheon (KR)

(72) Inventors: Hyung Il Baek, Yongin-si (KR); Joo Seung Maeng, Incheon (KR); Ki Sang Lim, Incheon (KR); Seong Hyun Kim, Gwacheon-si (KR); Eui Jin Jeong, Incheon (KR); Du Hyun Song, Incheon (KR); Kil Jae Jang, Seongnam-si (KR); Ki-Chul Kim, Incheon (KR); Jin Won Noh, Gwangju (KR)

(73) Assignee: AMOTECH CO., LTD., Incheon (KR)

( * ) Notice: Subject to any disclaimer, the term of this patent is extended or adjusted under 35 U.S.C. 154(b) by 110 days.

(21) Appl. No.: 17/258,141

(22) PCT Filed: Jul. 5, 2019

(86) PCT No.: PCT/KR2019/008304
§ 371 (c)(1),
(2) Date: Jan. 5, 2021

(87) PCT Pub. No.: WO2020/009539
PCT Pub. Date: Jan. 9, 2020

(65) Prior Publication Data
US 2021/0280976 A1 Sep. 9, 2021

(30) Foreign Application Priority Data

Jul. 6, 2018 (KR) .......................... 10-2018-0078824

(51) Int. Cl.
*H01Q 7/06* (2006.01)

(52) U.S. Cl.
CPC .................................. *H01Q 7/06* (2013.01)

(58) Field of Classification Search
CPC .................................. H01Q 7/06; H01Q 7/00
See application file for complete search history.

(56) References Cited

U.S. PATENT DOCUMENTS

| | | | |
|---|---|---|---|
| 9,633,305 | B2 | 4/2017 | Ito et al. |
| 9,634,392 | B2 | 4/2017 | Saito et al. |
| | | (Continued) | |

FOREIGN PATENT DOCUMENTS

| | | | |
|---|---|---|---|
| CN | 103633421 A | | 3/2014 |
| CN | 103915681 A | * | 7/2014 |
| | (Continued) | | |

OTHER PUBLICATIONS

IN Office Action in Application No. 202017056861 dated Aug. 18, 2021.

(Continued)

*Primary Examiner* — Dieu Hien T Duong
(74) *Attorney, Agent, or Firm* — Maschoff Brennan

(57) ABSTRACT

Proposed is a combo antenna module which laminates a loop coil and an antenna sheet to configure a combo antenna, thereby preventing the degree of design freedom from being lowered and minimizing the manufacturing cost. The proposed combo antenna module includes a magnetic sheet, a loop coil disposed on the upper surface of the magnetic sheet, and an antenna sheet having the area smaller than that of the magnetic sheet, and disposed on the upper surface of the magnetic sheet, in which the antenna sheet overlaps a part of the loop coil.

9 Claims, 12 Drawing Sheets

(56) References Cited

U.S. PATENT DOCUMENTS

| | | | |
|---|---|---|---|
| 9,692,128 B2 | 6/2017 | Kato et al. | |
| 9,893,419 B2 | 2/2018 | Yosui et al. | |
| 10,050,339 B2 | 8/2018 | Yosui et al. | |
| 2014/0168019 A1* | 6/2014 | Hirobe | H02J 7/025 |
| | | | 343/788 |
| 2015/0077296 A1 | 3/2015 | An et al. | |
| 2015/0280322 A1 | 10/2015 | Saito et al. | |
| 2017/0005399 A1 | 1/2017 | Ito et al. | |
| 2017/0084980 A1 | 3/2017 | Kato | |
| 2018/0069299 A1 | 3/2018 | Kang et al. | |
| 2018/0301790 A1* | 10/2018 | Kim | H04B 5/0037 |
| 2019/0165474 A1 | 5/2019 | An et al. | |
| 2019/0173182 A1 | 6/2019 | Kim | |
| 2019/0236433 A1* | 8/2019 | Maeng | H04M 1/02 |

FOREIGN PATENT DOCUMENTS

| | | |
|---|---|---|
| CN | 103918192 A | 7/2014 |
| JP | 2009-182902 A | 8/2009 |
| JP | 2011-211611 A | 10/2011 |
| JP | 5435130 B2 | 3/2014 |
| JP | 5464307 B2 | 4/2014 |
| JP | 2015-513276 A | 4/2015 |
| JP | 10-2015-0085050 B1 | 10/2015 |
| JP | 2016-184966 A | 10/2016 |
| JP | 6101710 B2 | 3/2017 |
| KR | 10-2015-0085050 A | 7/2015 |
| KR | 10-2016-0129927 A | 11/2016 |
| KR | 10-2017-0093670 A | 8/2017 |
| KR | 10-2018-0019320 A | 2/2018 |
| KR | 10-2018-0033104 A | 4/2018 |
| KR | 10-2018-0047823 A | 5/2018 |
| WO | 2013/035821 A1 | 3/2015 |

OTHER PUBLICATIONS

KR Office Action dated Jan. 10, 2020 as received in Application No. 10-2019-0081390.

KR Decision to Grant Dated Jun. 24, 2020 as received in Application No. 10-2019-0081390.

CN Office Action in Application No. 201980045342.6 dated Nov. 3, 2022.

* cited by examiner

[Fig. 1]
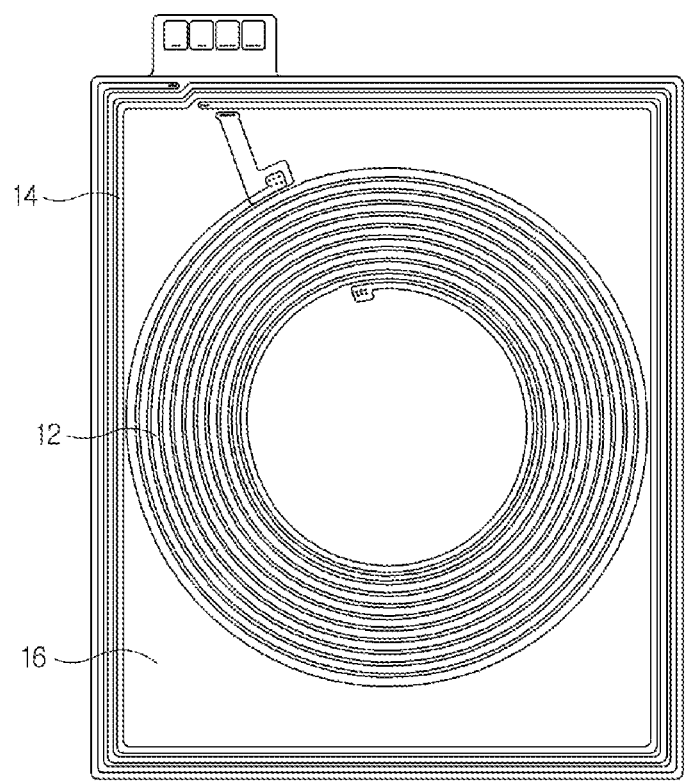
Prior art

[Fig. 2]
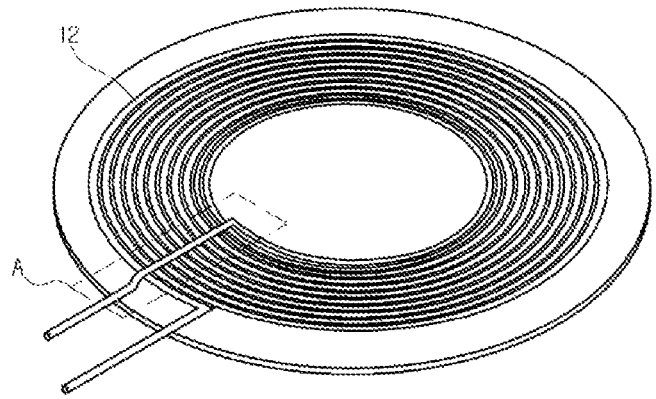
Prior art
[Fig. 3]
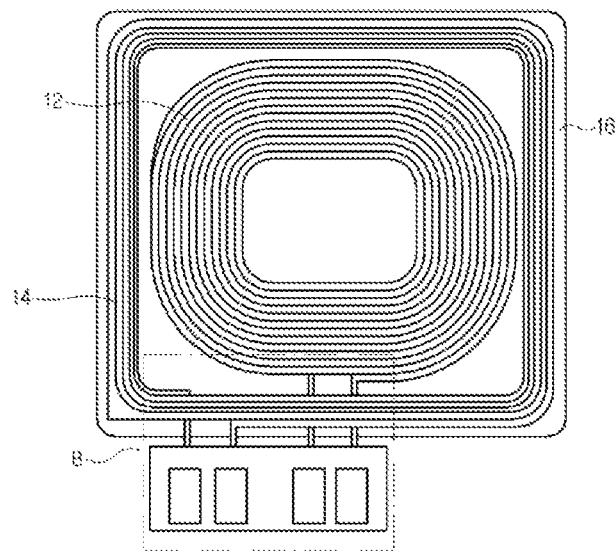
Prior art

[FIG. 4]
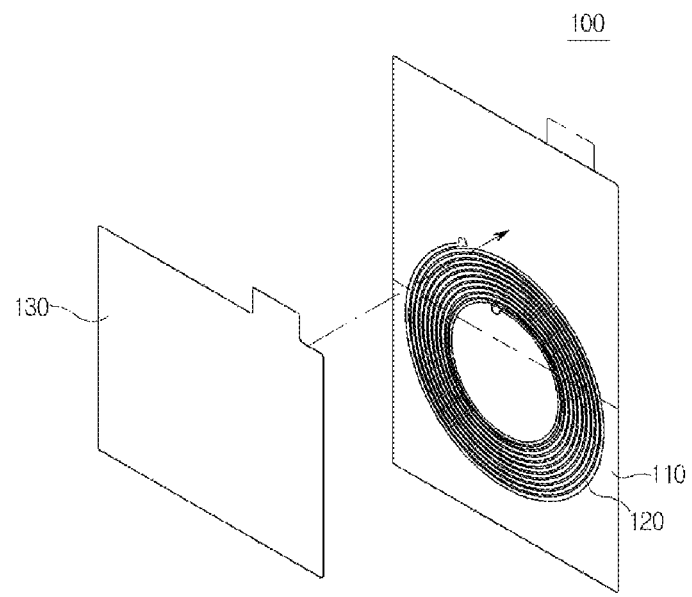
[FIG. 5]
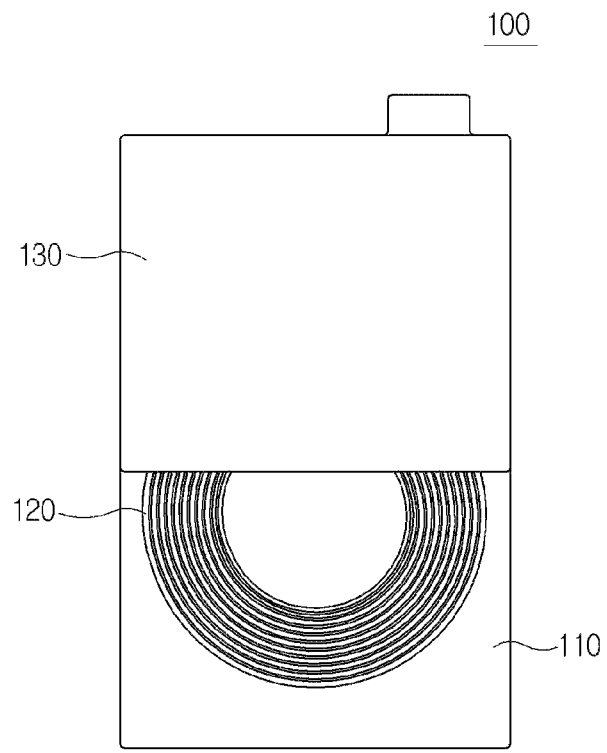

[FIG. 6]
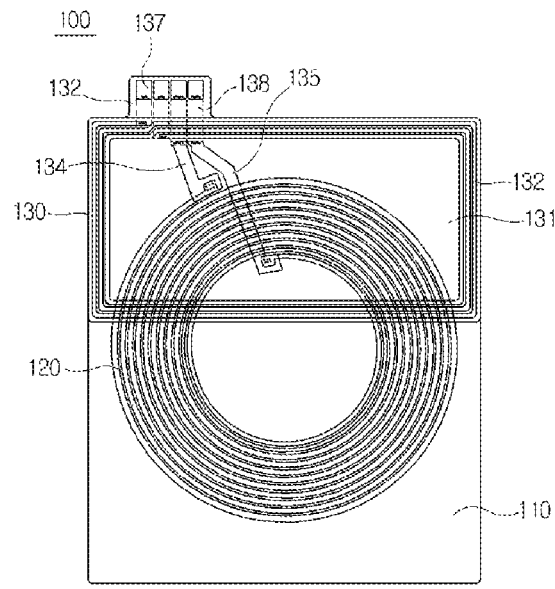
[FIG. 7]
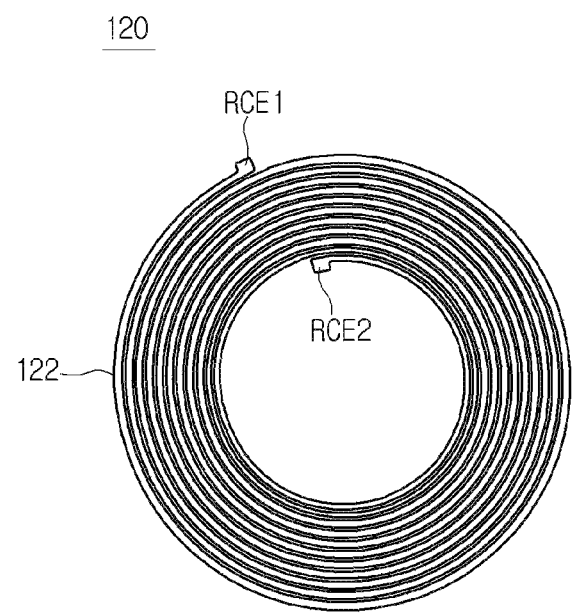

[FIG. 8]
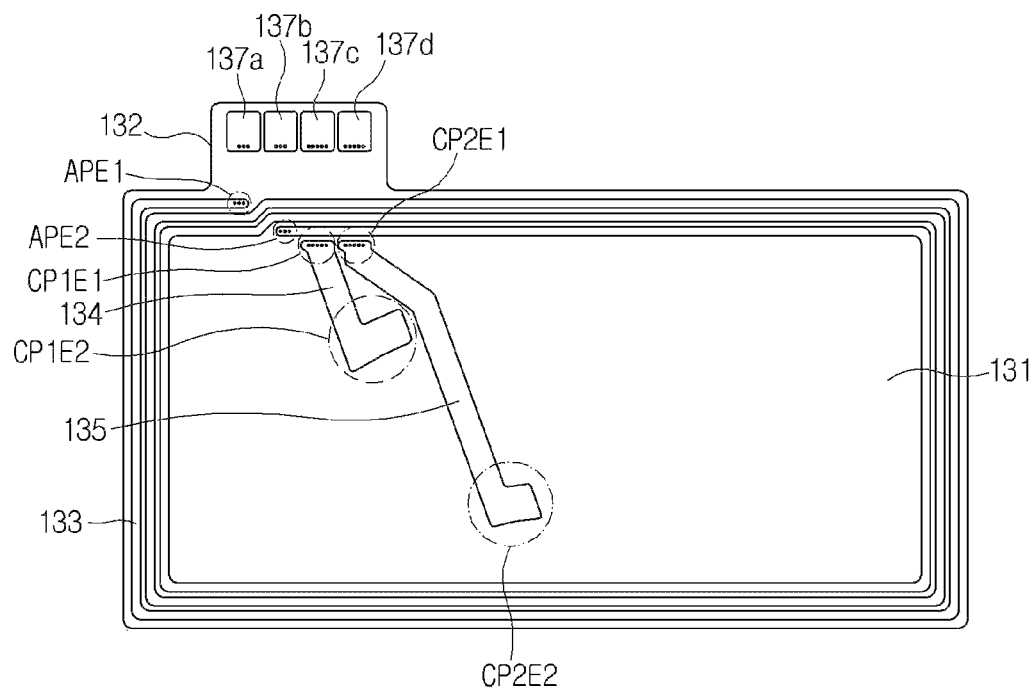
[FIG. 9]
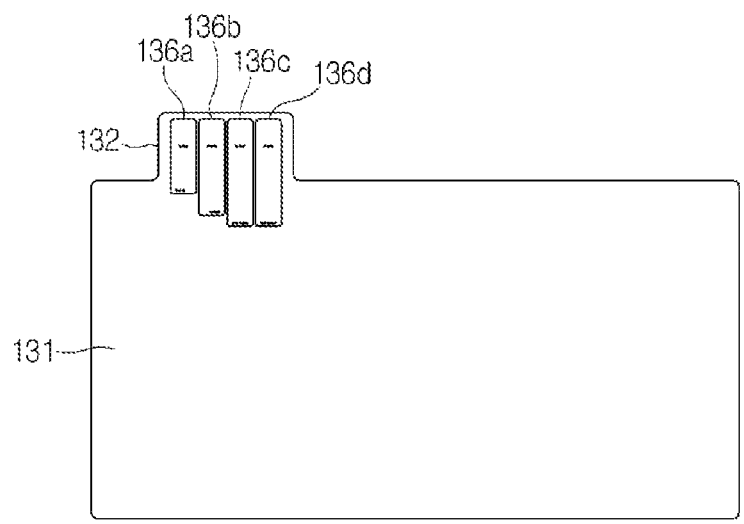

[FIG. 10]
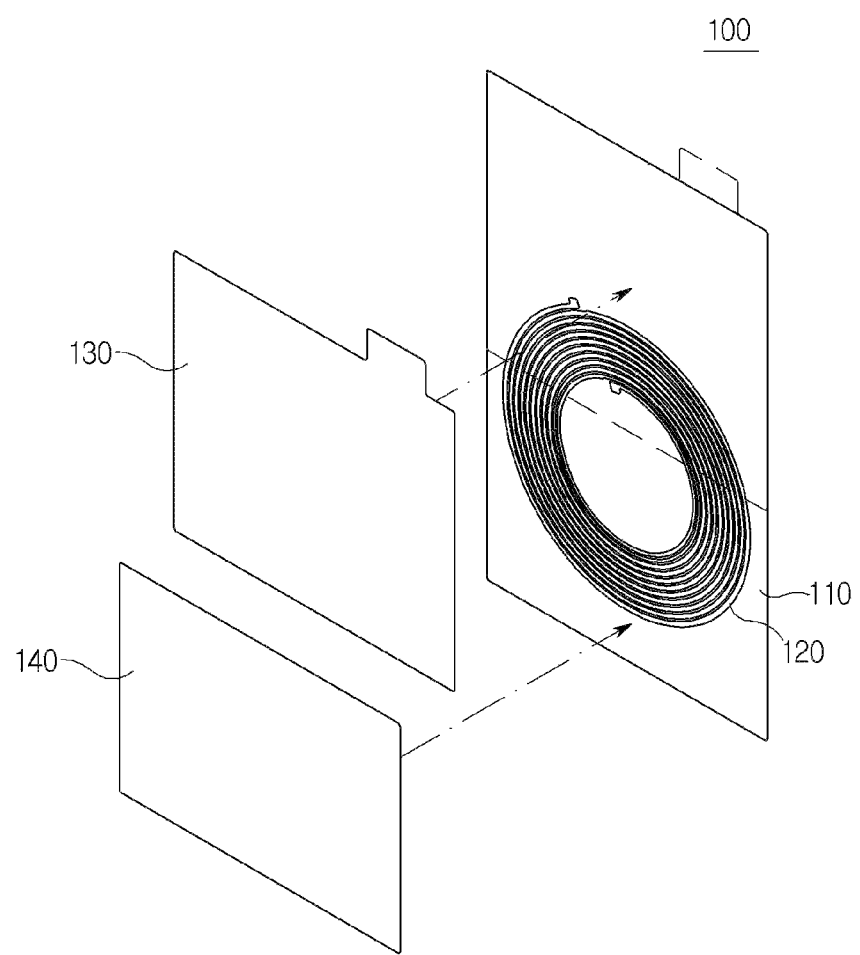

[FIG. 11]
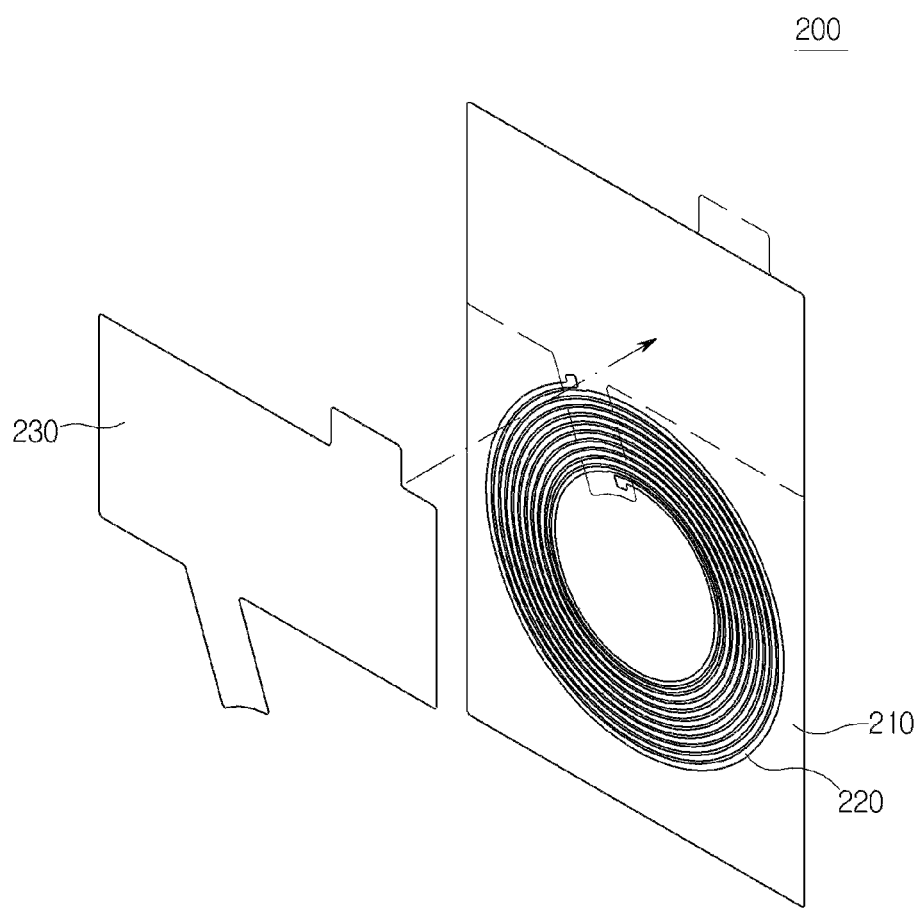

[FIG. 12]
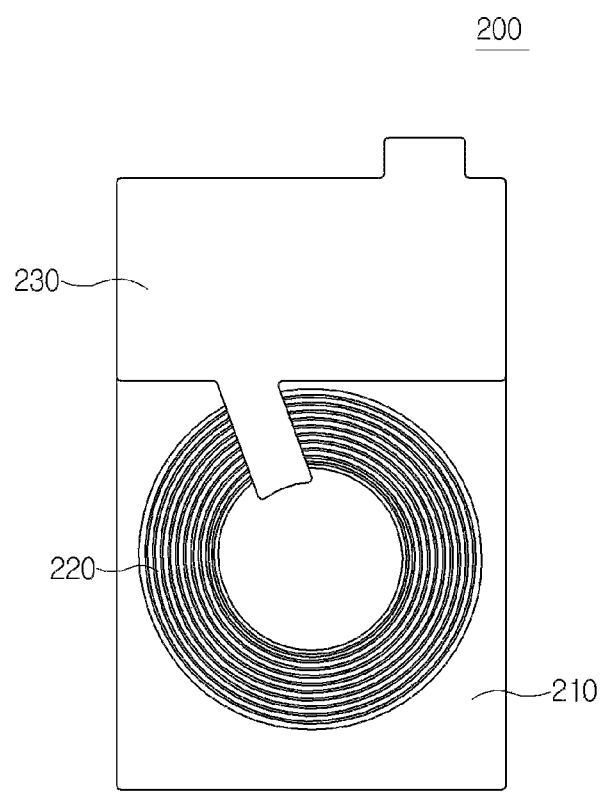

[FIG. 13]
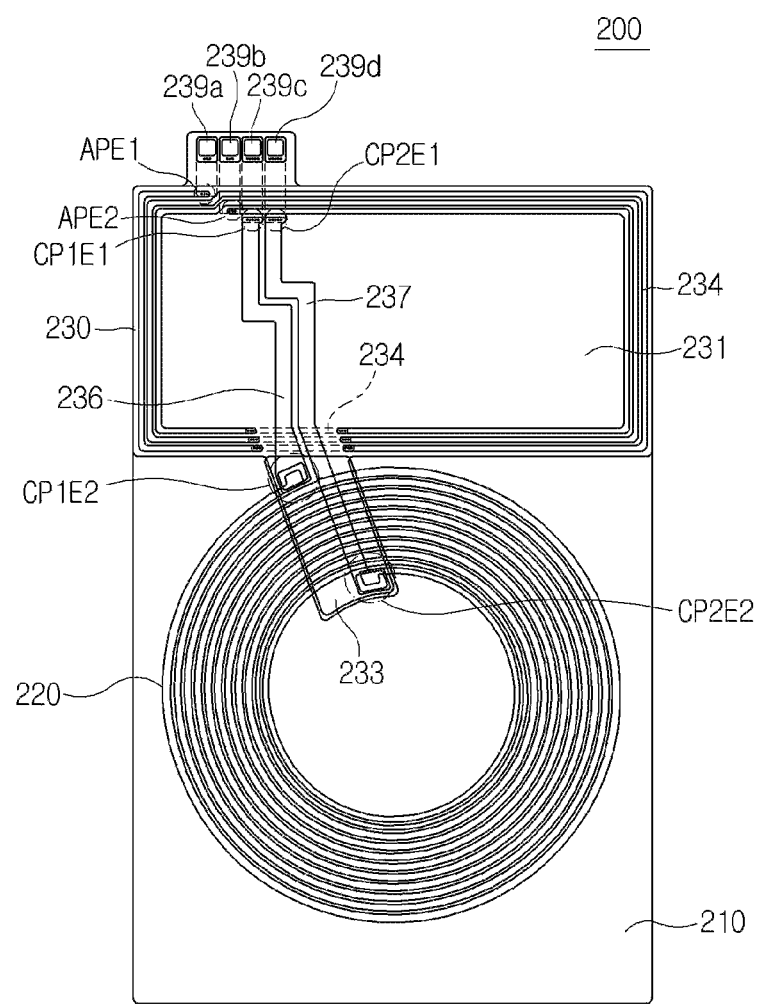

[FIG. 14]
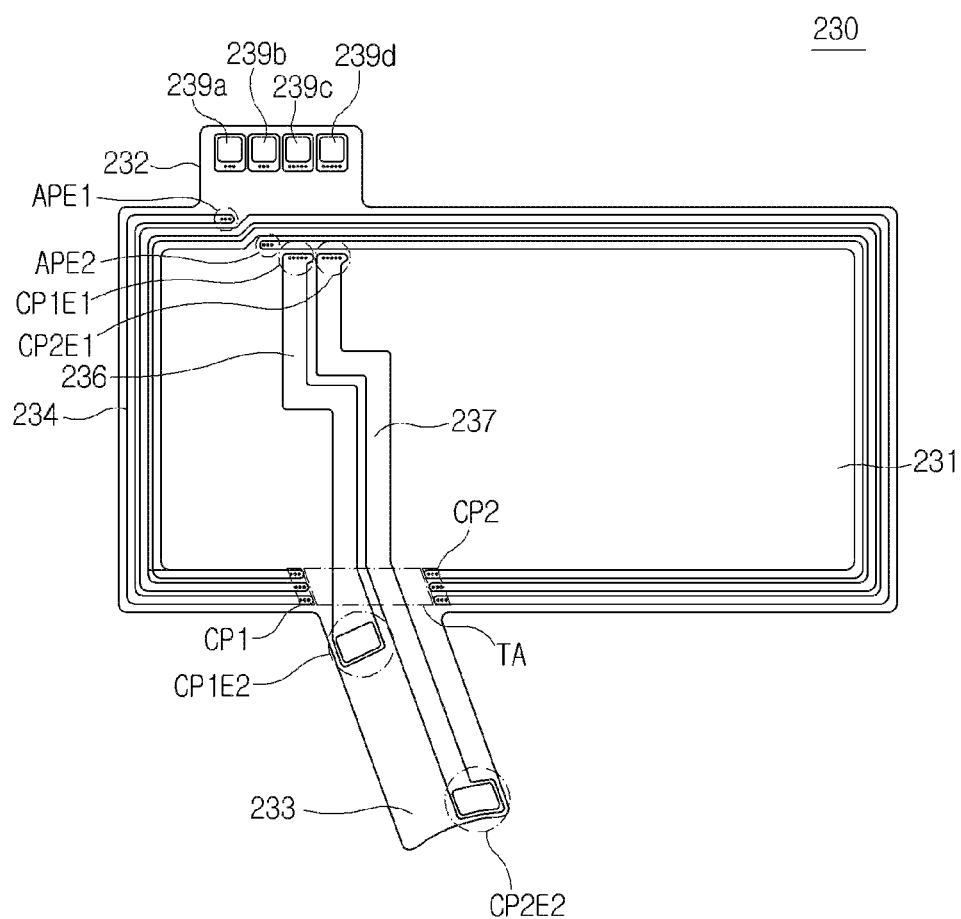

[FIG. 15]
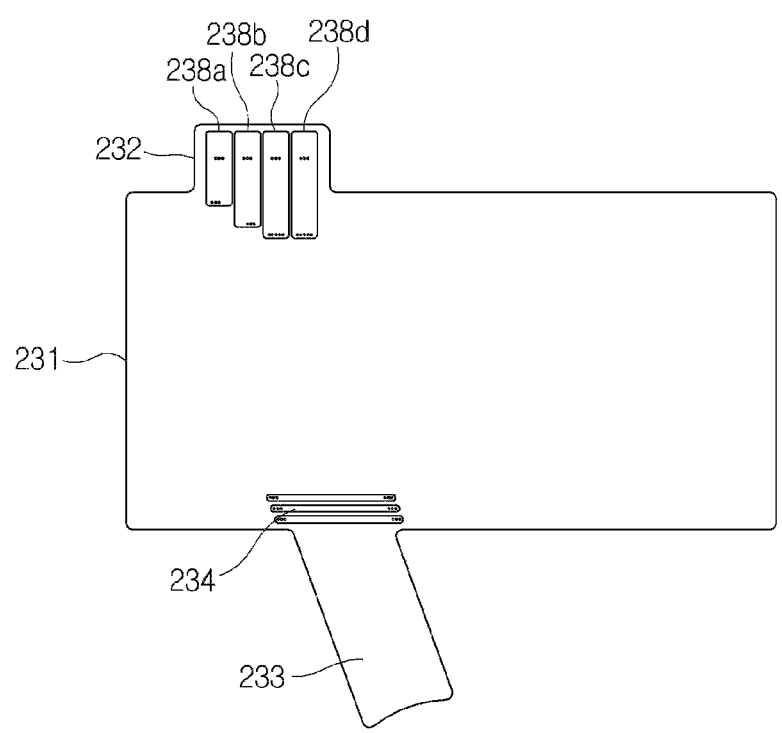

[FIG. 16]
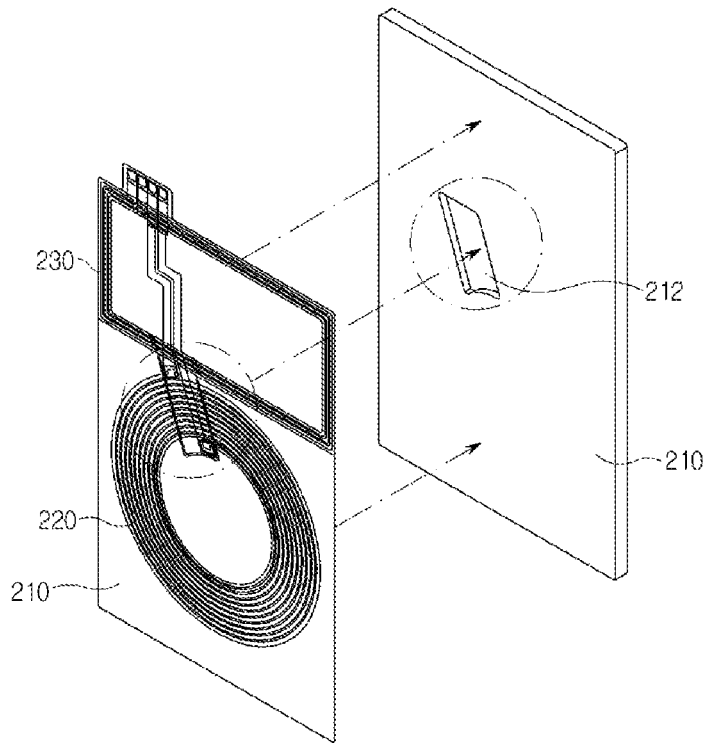
[FIG. 17]
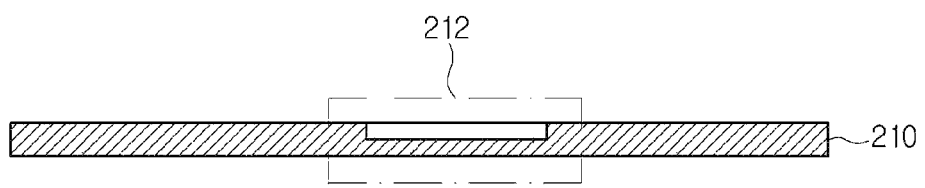
[FIG. 18]
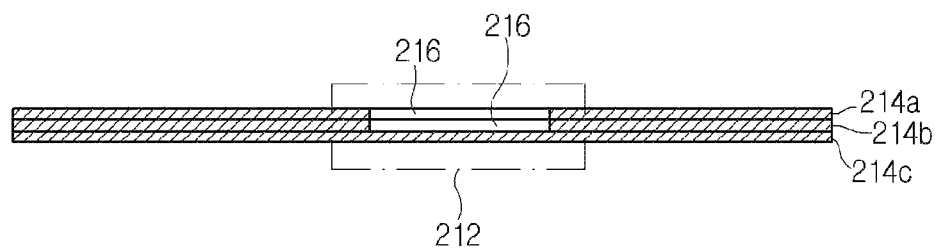

COMBO ANTENNA MODULE

TECHNICAL FIELD

The present disclosure relates to a combo antenna module, and more specifically, to a combo antenna module mounted on a portable terminal to perform the wireless power reception and the short range communication.

BACKGROUND ART

With the technology development, the short range communication function and the wireless power reception (or wireless charging) function are applied to a portable terminal. That is, the portable terminal transmits and receives data to and from other electronic devices using the short range communication (e.g., NFC) function, and charges an embedded battery using the wireless power reception (or wireless charging) function.

Meanwhile, in the portable terminal market, the portable terminal is released by being classified into a low-priced line and a high-priced line. At this time, the low-priced line is released by excluding the wireless charging function from the high-priced line, or limiting the performance of the short range communication.

In recent years, since the low-priced terminal also requires the wireless charging function, the manufacturers are developing an antenna module for providing the wireless charging function while minimizing the increase in the manufacturing cost.

DISCLOSURE

Technical Problem

The present disclosure is proposed to solve the above conventional problem, and an object of the present disclosure is to provide a combo antenna module, which configures a combo antenna by laminating a loop coil and an antenna sheet, thereby preventing the degree of design freedom from being lowered and minimizing the manufacturing cost.

Technical Solution

For achieving the object, a combo antenna module according to an exemplary embodiment of the present disclosure includes: a magnetic sheet, a loop coil disposed on an upper surface of the magnetic sheet, and an antenna sheet having the area smaller than an area of the magnetic sheet, and disposed on the upper surface of the magnetic sheet, in which the antenna sheet overlaps a part of the loop coil.

The loop coil may be formed of a metal wire formed in a loop shape in which a virtual winding axe perpendicular to the magnetic sheet is wound by the loop coil in plural times.

The antenna sheet may include: a flexible base sheet having an area smaller than an area of the magnetic sheet, and the base sheet may be configured to overlap a region in which a first end and a second end of the loop coil are disposed. The antenna sheet may further include: an antenna pattern formed in a loop shape and disposed on the upper surface of the base sheet, and the antenna pattern may be configured to overlap a part of the loop coil.

The antenna sheet may further include: a first connection pattern disposed on the upper surface of the base sheet, and electrically connected to the first end of the loop coil and a second connection pattern spaced apart from the first connection pattern and disposed on the upper surface of the base sheet, and electrically connected to the second end of the loop coil. The first connection pattern and the second connection pattern may be disposed in the inner region of the loop formed by the antenna pattern, and the first end and the second end of the loop coil may be configured to overlap an inner region of the loop formed by the antenna pattern on the lower surface of the base sheet.

A first end of the first connection pattern may be configured to be exposed to the lower surface of the base sheet through a region in which a part of the base sheet is removed, and electrically connected to the first end of the loop coil in the region exposed to the lower surface of the base sheet, and the first end of the second connection pattern may be configured to be exposed to the lower surface of the base sheet through a region in which a part of the base sheet is removed, and electrically connected to the second end of the loop coil in the region exposed to the lower surface of the base sheet.

The antenna sheet may further include: a terminal sheet extending from one side of the base sheet, and formed with a plurality of terminal patterns.

The magnetic sheet may be configured to be formed with a step compensation groove in a region of overlapping the loop coil and the antenna sheet. At this time, the magnetic sheet may be configured as a laminate formed by laminating one or more sheets in which a hole is formed in the region of overlapping the loop coil and the antenna sheet.

The combo antenna module according to the exemplary embodiment of the present disclosure may further include: a step compensation sheet having an area smaller than an area of the magnetic sheet, and disposed on the upper surface of the magnetic sheet, in which the step compensation sheet may be disposed to cover a region not overlapping the antenna sheet on the magnetic sheet.

Meanwhile, the antenna sheet may include: a flexible base sheet having an area smaller than the area of the magnetic sheet and an extension sheet formed to extend from one side of the base sheet toward a center portion of the loop coil, in which the extension sheet may be configured to overlap a region in which the first end and the second end of the loop coil are disposed.

The antenna sheet may further include: a first connection pattern disposed over an upper surface of the base sheet and the upper surface of the extension sheet, and electrically connected to the first end of the loop coil and a second connection pattern spaced apart from the first connection pattern and disposed over the upper surface of the base sheet and the upper surface of the extension sheet, and electrically connected to the second end of the loop coil.

At this time, the first end of the first connection pattern may be configured to be exposed to the lower surface of the extension sheet through the region in which a part of the extension sheet is removed and electrically connected to the first end of the loop coil, and the first end of the second connection pattern may be configured to be exposed to the lower surface of the extension sheet through the region in which a part of the extension sheet is removed and electrically connected to the second end of the loop coil.

The antenna sheet may further include: an antenna pattern formed on the upper surface of the base sheet and a bypass pattern formed on the lower surface of the base sheet, and a part of the antenna pattern in a penetration region is removed, the first connection pattern and the second connection pattern intersecting with the antenna pattern in the penetration region, and the bypass pattern may be configured to be connected to the antenna pattern. At this time, one end of the bypass pattern may be configured to be electrically connected to a cut-out part of the antenna pattern disposed on the left side of the penetration region, and other end of the bypass pattern may be configured to be electrically connected to a cut-out part of the antenna pattern disposed on the right side of the penetration region.

Advantageous Effects

According to the present disclosure, the combo antenna module may implement the antenna for the wireless power transmission in the coil type, thereby saving the manufacturing cost of the combo antenna and improving the antenna efficiency.

Further, the combo antenna module may decrease the area of the antenna sheet (i.e., FPCB) for implementing the antenna pattern by half, and implement a jumper of the loop coil with the connection pattern formed on the antenna sheet, thereby preventing the degree of design freedom from being lowered and minimizing the thickness of the combo antenna module.

Further, the combo antenna module may form the step compensation groove in the magnetic sheet, thereby minimizing the increase in the thickness due to the overlapping between the loop coil and the antenna sheet.

DESCRIPTION OF DRAWINGS

FIGS. 1 to 3 are diagrams for explaining a conventional combo antenna module.

FIGS. 4 to 6 are diagrams for explaining a combo antenna module according to a first exemplary embodiment of the present disclosure.

FIG. 7 is a diagram for explaining a loop coil illustrated in FIG. 4.

FIGS. 8 and 9 are diagrams for explaining an antenna sheet illustrated in FIG. 4.

FIG. 10 is a diagram for explaining a modified example of the combo antenna module according to the first exemplary embodiment of the present disclosure.

FIGS. 11 to 13 are diagrams for explaining a combo antenna module according to a second exemplary embodiment of the present disclosure.

FIGS. 14 and 15 are diagrams for explaining an antenna sheet illustrated in FIG. 11.

FIGS. 16 to 18 are diagrams for explaining a modified example of the combo antenna module according to the second exemplary embodiment of the present disclosure.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure.

First, in adding reference numerals to the components of each drawing, it should be noted that the same components have the same reference numerals as much as possible even if they are displayed in different drawings.

Further, in describing the exemplary embodiment of the present disclosure, when it is determined that the detailed description of the related well-known configuration or function may obscure the gist of the present disclosure, the detailed description thereof will be omitted.

Further, in describing the exemplary embodiment of the present disclosure, if it is described that a certain structure is disposed or formed on "the upper surface" or "the lower surface" of another structure, the description should be interpreted as including the case where these structures are in contact with each other and the case where a third structure is interposed between these structures.

Referring to FIG. 1, a conventional combo antenna module implements a wireless power reception antenna 12, a short range communication antenna 14, and the like on one flexible printed circuit board 16. At this time, since the combo antenna module implements a plurality of antennas on one flexible printed circuit board 16, there are advantages in that it is possible to reduce the thickness and it is easy to design the pattern.

However, since the wireless power reception antenna 12 for receiving the wireless power for the wireless charging of the portable terminal requires a high-specification material (i.e., flexible printed circuit board 16), there is a problem in that the area of the flexible printed circuit board 16 is increased, thereby increasing the cost of the combo antenna module.

Referring to FIGS. 2 and 3, the combo antenna module may manufacture the wireless power reception antenna 12 with a low-priced coil, thereby minimizing the increase in the cost.

However, there are problems in that the combo antenna module has a jumper intersecting a coil, thereby increasing the thickness (A in FIG. 2), and a step part (B in FIG. 3) should be formed on the printed circuit board 16 (FPCB or PCB), thereby lowering the degree of design freedom.

Therefore, an exemplary embodiment of the present disclosure provides a combo antenna module which prevents the degree of design freedom from being lowered and minimizing the manufacturing cost.

Referring to FIGS. 4 to 6, a combo antenna module 100 according to a first exemplary embodiment of the present disclosure is configured to include a magnetic sheet 110, a loop coil 120, and an antenna sheet 130. The combo antenna module 100 according to the first exemplary embodiment of the present disclosure is configured in a structure in which the loop coil 120 and the antenna sheet 130 partially overlaps.

The magnetic sheet 110 may be formed of a plate-shaped substrate or a film made of a magnetic material. The magnetic sheet 110 is formed of, for example, a sheet or a film having the magnetic property such as ferrite, nano crystalline alloy, or iron-based amorphous ribbon.

The magnetic sheet 110 may also be formed of a laminate in which a plurality of sheets or a plurality of films are laminated. At this time, the magnetic sheet 110 is formed of, for example, a laminate in which sheets or films made of the same materials are laminated. The magnetic sheet 110 may also be configured as a laminate formed by laminating the sheets or the films having different materials.

The loop coil 120 is disposed on the upper surface of the magnetic sheet 110. Here, the upper surface of the magnetic sheet 110 refers to one surface of the magnetic sheet 110 disposed in the rear cover direction of the portable terminal, when the combo antenna module 100 is mounted on the portable terminal. At this time, the loop coil 120 is, for example, the coil for the wireless power transmission or the wireless power reception.

The loop coil 120 is made of a conductive material, and formed in the loop shape in which a winding axe perpendicular to the upper surface of the magnetic sheet 110 is wound in plural times. At this time, the loop coil 120 is interposed between the magnetic sheet 110 and the antenna sheet 130. The loop coil 120 entirely overlaps the magnetic sheet 110, and partially overlaps the antenna sheet 130.

Referring to FIG. 7, for example, the loop coil 120 has a cooper wire 122 disposed to wind the winding axe in plural times and is formed in the circular loop shape. At this time, a first end (RCE1) of the loop coil 120 is disposed on the outer region of the loop.

As described above, the combo antenna module 100 may implement the antenna for the wireless power transmission in the coil type, thereby saving the manufacturing cost of the combo antenna and improving the antenna efficiency.

The antenna sheet 130 is disposed on the upper surface of the magnetic sheet 110. The antenna sheet 130 is formed to have the area smaller than that of the magnet sheet 110, and disposed to cover a part of the upper surface of the magnetic sheet 110. At this time, the antenna sheet 130 is disposed such that an antenna pattern 133 partially overlaps the loop coil 120.

Referring to FIGS. 8 and 9, the antenna sheet 130 is configured to include a base sheet 131, a terminal sheet 132, the antenna pattern 133, a first connection pattern 134, a second connection pattern, a first lower terminal pattern 136*a*, a second lower terminal pattern 136*b*, a third lower terminal pattern 136*c*, a fourth lower terminal pattern 136*d*, a first upper terminal pattern 137*a*, a second upper terminal pattern 137*b*, a third upper terminal pattern 137*c*, and a fourth upper terminal pattern 137*d*.

The base sheet 131 is formed of a flexible substrate of a thin film such as a film, a sheet, or a thin film substrate. The base sheet 131 may be a flexible printed circuit board (FPCB). The base sheet 131 is, for example, a polypropylene (PP) sheet. Here, the base sheet 131 is not limited thereto, and may be variously used as long as it may be a thin film substrate and may be the substrate capable of forming the antenna pattern 133 configuring the antenna.

The base sheet 131 is formed to have the area smaller than that of the magnetic sheet 110 and disposed on the upper surface of the magnetic sheet 110. The base sheet 131 is formed to have a half or less of the area of the magnetic sheet 110, and disposed on the upper surface of the magnetic sheet 110. The base sheet 131 is disposed to be tilted to one side of four sides of the magnetic sheet 110.

The base sheet 131 overlaps the loop coil 120 disposed on the upper surface of the magnetic sheet 110. The base sheet 131 overlaps the region, in which the first end (RCE1) and the second end (RCE2) of the loop coil 120 are disposed, in the loop region in which the loop coil 120 is formed.

The terminal sheet 132 is formed such that the base sheet 131 extends outward from one side thereof. The terminal sheet 132 is the sheet on which terminal patterns are formed and is formed to extend outward from one side, which is adjacent to the loop coil 120 and both ends of the antenna pattern 133 to be described later, of four sides the base sheet 131. Here, the terminal sheet 132 may be formed integrally with the base sheet 131, or formed separately therefrom, and then coupled to the base sheet 131.

The antenna pattern 133 is formed on the upper surface of the base sheet 131. The antenna pattern 133 is formed in the loop shape in which a virtual winding axe perpendicular to the base sheet 131 is wound in plural times. The antenna pattern 133 is formed in the rectangular loop shape winding along four sides of the base sheet 131. At this time, the antenna pattern 133 may also be formed on the lower surface of the base sheet 131.

A first end (APE1) of the antenna pattern 133 is disposed on the outer region of the loop formed by the antenna pattern 133. The first end (APE1) of the antenna pattern 133 is electrically connected to the first upper terminal pattern 137*a* and the first lower terminal pattern 136*a* through a via hole.

A second end (APE2) of the antenna pattern 133 is disposed on the inner region of the loop formed by the antenna pattern 133. The second end (APE2) of the antenna pattern 133 is electrically connected to the second upper terminal pattern 137*b* and the second lower terminal pattern 136*b* through a via hole.

The first connection pattern 134 is formed on the upper surface of the base sheet 131. The first connection pattern 134 is formed in the inner region of the loop formed by the antenna pattern 133 on the upper surface of the base sheet 131. The first connection pattern 134 electrically connects the first end (RCE1) of the loop coil 120 to the third lower terminal pattern 136*c*.

A first end (CP1E1) of the first connection pattern 134 is electrically connected to the first end (RCE1) of the loop coil 120. The first end (CP1E1) of the first connection pattern 134 is disposed in the region overlapping the first end (RCE1) of the loop coil 120 on the upper surface of the base sheet 131. The first end (CP1E1) of the first connection pattern 134 is electrically connected to the first end (RCE1) of the loop coil 120 through soldering.

For example, a part of the base sheet 131 is removed in the region in which the first end (CP1E1) of the first connection pattern 134 is disposed. The first end (CP1E1) of the first connection pattern 134 is exposed to the lower surface of the base sheet 131 through the region where the base sheet 131 is removed. By soldering the first end (RCE1) of the loop coil 120 with the first end (CP1E1) of the first connection pattern 134 exposed to the lower surface of the base sheet 131, the first connection pattern 134 is electrically connected to the first end (RCE1) of the loop coil 120.

A second end (CPE2) of the first connection pattern 134 is electrically connected to the third lower terminal pattern 136*c*. The second end (CPE2) of the first connection pattern 134 is disposed in the region overlapping the third lower terminal pattern 136*c* on the upper surface of the base sheet 131. The second end (CPE2) of the first connection pattern 134 is electrically connected to the third lower terminal pattern 136*c* through a via hole.

For example, the second end (CPE2) of the first connection pattern 134 forms the overlapping region with the third lower terminal pattern 136*c* formed on the lower surface of the base sheet 131. The second end (CPE2) of the first connection pattern 134 is electrically connected to the third lower terminal pattern 136*c* through a via hole formed in the overlapping region.

The second connection pattern is formed to be spaced apart from the first connection pattern 134 on the upper surface of the base sheet 131. The second connection pattern is formed in the inner region of the loop formed by the antenna pattern 133 on the upper surface of the base sheet 131. The second connection pattern electrically connects the second end (RCE2) of the loop coil 120 to the fourth lower terminal pattern 136*d*.

A second end (CP2E1) of the second connection pattern is electrically connected to the second end (RCE2) of the loop coil 120. The second end (CP2E1) of the second connection pattern is disposed in the region overlapping the second end (RCE2) of the loop coil 120 on the upper surface of the base sheet 131. The second end (CP2E1) of the second connection pattern is electrically connected to the second end (RCE2) of the loop coil 120 through soldering.

For example, a part of the base sheet 131 is removed in the region in which the second end (CP2E1) of the second connection pattern is disposed. The second end (CP2E1) of the second connection pattern is exposed to the lower surface of the base sheet 131 through the region in which the base sheet 131 is removed. By soldering the second end (RCE2) of the loop coil 120 with the second end (CP2E1) of the second connection pattern exposed to the lower surface of the base sheet 131, the second connection pattern is electrically connected to the second end (RCE2) of the loop coil 120.

The second end (CP2E2) of the second connection pattern is electrically connected to the fourth lower terminal pattern 136d. The second end (CP2E2) of the second connection pattern is disposed in the region overlapping the fourth lower terminal pattern 136d on the upper surface of the base sheet 131. The second end (CP2E2) of the second connection pattern is electrically connected to the fourth lower terminal pattern 136d through a via hole.

For example, the second end (CP2E2) of the second connection pattern forms the overlapping region with the fourth lower terminal pattern 136d formed on the lower surface of the base sheet 131. The second end (CP2E2) of the second connection pattern is electrically connected to the fourth lower terminal pattern 136d through a via hole formed in the overlapping region.

As described above, the combo antenna module 100 may decrease the area of the base sheet 131 (i.e., FPCB) for implementing the antenna pattern 133 by half, and implement the jumper of the loop coil 120 with the connection pattern formed on the base sheet 131, thereby minimizing the thickness of the combo antenna module 100.

At this time, the combo antenna module 100 may implement the jumper of the loop coil 120 in the pattern method, thereby causing the loss of some resistances but this is not the loss of the resistance of the size capable of actually affecting the antenna performance of the loop coil 120, such that the antenna performance of the loop coil 120 is not lowered.

The first lower terminal pattern 136a to the fourth lower terminal pattern 136d are formed over the lower surface of the terminal sheet 132 and the lower surface of the base sheet 131. At this time, the first lower terminal pattern 136a to the fourth lower terminal pattern 136d are formed to be spaced apart from each other.

The first end of the first lower terminal pattern 136a is disposed on the terminal sheet 132. The first lower terminal pattern 136a is formed to extend from the first end toward the base sheet 131, and the second end of the first lower terminal pattern 136a is disposed on the lower surface of the base sheet 131.

At this time, the second end of the first lower terminal pattern 136a is disposed in the region overlapping with the first end (APE1) of the antenna pattern 133 on the lower surface of the base sheet 131. The second end of the first lower terminal pattern 136a is electrically connected to the first end (APE1) of the antenna pattern 133 through a via hole.

The first end of the second lower terminal pattern 136b is disposed on the terminal sheet 132. The second lower terminal pattern 136b is formed to extend from the first end toward the base sheet 131, and the second end of the second lower terminal pattern 136b is disposed on the lower surface of the base sheet 131.

At this time, the second end of the second lower terminal pattern 136b is disposed in the region overlapping the second end (APE2) of the antenna pattern 133 on the lower surface of the base sheet 131. The second end of the second lower terminal pattern 136b is electrically connected to the second end (APE2) of the antenna pattern 133 through a via hole.

The first end of the third lower terminal pattern 136c is disposed on the terminal sheet 132. The third lower terminal pattern 136c is formed to extend from the first end toward the base sheet 131, and the second end of the third lower terminal pattern 136c is disposed on the lower surface of the base sheet 131.

At this time, the second end of the third lower terminal pattern 136c is disposed in the region overlapping the second end (CPE2) of the first connection pattern 134 on the lower surface of the base sheet 131. The second end of the third lower terminal pattern 136c is electrically connected to the second end (CPE2) of the first connection pattern 134 through soldering.

The first end of the fourth lower terminal pattern 136d is disposed on the terminal sheet 132. The fourth lower terminal pattern 136d is formed to extend from the first end toward the base sheet 131, and the second end of the fourth lower terminal pattern 136d is disposed on the lower surface of the base sheet 131.

At this time, the second end of the fourth lower terminal pattern 136d is disposed in the region overlapping the second end (CP2E2) of the second connection pattern on the lower surface of the base sheet 131. The second end of the fourth lower terminal pattern 136d is electrically connected to the second end (CP2E2) of the second connection pattern through soldering.

The first upper terminal pattern 137a to the fourth upper terminal pattern 137d are formed on the upper surface of the terminal sheet 132. At this time, the first upper terminal pattern 137a to the fourth upper terminal pattern 137d are formed to be spaced apart from each other.

The first upper terminal pattern 137a is formed on the upper surface of the terminal sheet 132. The first upper terminal pattern 137a is formed on the lower surface of the terminal sheet 132, and overlaps a part of the first lower terminal pattern 136a. The first upper terminal pattern 137a is electrically connected to the first lower terminal pattern 136a through a via hole.

The second upper terminal pattern 137b is formed on the upper surface of the terminal sheet 132. The second upper terminal pattern 137b is formed on the lower surface of the terminal sheet 132, and overlaps a part of the second lower terminal pattern 136b. The second upper terminal pattern 137b is electrically connected to the second lower terminal pattern 136b through a via hole.

The third upper terminal pattern 137c is formed on the upper surface of the terminal sheet 132. The third upper terminal sheet 137c is formed on the lower surface of the terminal sheet 132, and overlaps a part of the third lower terminal pattern 136c. The third upper terminal pattern 137c is electrically connected to the third lower terminal pattern 136c through a via hole.

The fourth upper terminal pattern 137d is formed on the upper surface of the terminal sheet 132. The fourth upper terminal pattern 137d is formed on the lower surface of the terminal sheet 132, and overlaps a part of the fourth lower terminal pattern 136d. The fourth upper terminal pattern 137d is electrically connected to the fourth lower terminal pattern 136d through a via hole.

The first upper terminal pattern 137a and the first lower terminal pattern 136a are electrically connected to the first end (APE1) of the antenna pattern 133, and the second upper terminal pattern 137*b* and the second lower terminal pattern 136*b* are electrically connected to the second end (APE2) of the antenna pattern 133.

The third upper terminal pattern 137*c* and the third lower terminal pattern 136*c* are electrically connected to the first end (RCE1) of the loop coil 120, and the fourth upper terminal pattern 137*d* and the fourth lower terminal pattern 136*d* are electrically connected to the second end (RCE2) of the loop coil 120.

Referring to FIG. 10, the combo antenna module 100 may further include a step compensation sheet 140. At this time, the step compensation sheet 140 is made of a resin material such as PET, for example.

The step compensation sheet 140 is disposed on the upper surface of the magnetic sheet 110. The step compensation sheet 140 is disposed to cover the region in which the antenna sheet 130 is not disposed on the upper surface of the magnetic sheet 110. The step compensation sheet 140 compensates the step between the magnetic sheet 110 and the antenna sheet 130 to flatten the combo antenna module 100.

Referring to FIGS. 11 to 13, a combo antenna module 200 according to a second exemplary embodiment of the present disclosure is configured to include a magnetic sheet 210, a loop coil 220, and an antenna sheet 230.

The magnetic sheet 210 may be formed of a plate-shaped substrate or a film made of a magnetic material. The magnetic sheet 210 is formed of, for example, a sheet or a film having the magnetic property such as ferrite, nano crystalline alloy, or iron-based amorphous ribbon.

The magnetic sheet 210 may also be formed of a laminate in which a plurality of sheets or a plurality of films are laminated. At this time, the magnetic sheet 210 is formed of, for example, a laminate in which sheets or films made of the same material are laminated. The magnetic sheet 210 may also be formed of, for example, a laminate in which sheets or films made of different materials are laminated.

The loop coil 220 is disposed on the upper surface of the magnetic sheet 210. Here, the upper surface of the magnetic sheet 210 refers to one surface of the magnetic sheet 210 disposed in the rear cover direction of the portable terminal, when the combo antenna module 200 is mounted on the portable terminal. At this time, the loop coil 220 is, for example, the coil for the wireless power transmission or the wireless power reception.

The loop coil 220 is made of a conductive material, and formed in the loop shape in which the winding axe perpendicular to the upper surface of the magnetic sheet 210 is wound in plural times. At this time, the loop coil 220 is interposed between the magnetic sheet 210 and the antenna sheet 230. The loop coil 220 entirely overlaps the magnetic sheet 210, and partially overlaps the antenna sheet 230.

For example, the loop coil 220 has a copper wire disposed to wind the winding axe in plural times and is formed in the circular loop shape.

A first end (RCE1) of the loop coil 220 is disposed on the outer region of the circular loop. The first end (RCE1) of the loop coil 220 is electrically connected to a third upper terminal pattern 239*c* and a third lower terminal pattern 238*c* through a first connection pattern 236.

A second end (RCE2) of the loop coil 220 is disposed on the inner region of the circular loop. The second end (RCE2) of the loop coil 220 is electrically connected to a fourth upper terminal pattern 239*d* and a fourth lower terminal pattern 238*d* through a second connection pattern 237.

The antenna sheet 230 is disposed on the upper surface of the magnetic sheet 210. The antenna sheet 230 is formed to have the area smaller than that of the magnet sheet 210, and disposed to cover a part of the upper surface of the magnetic sheet 210. At this time, the antenna sheet 230 is disposed such that an antenna pattern 234 does not overlap the loop coil 220.

Referring to FIGS. 14 and 15, the antenna sheet 230 is configured to include a base sheet 231, a terminal sheet 232, an extension sheet 233, the antenna pattern 234, a bypass pattern 235, a first connection pattern 236, a second connection pattern 237, a first lower terminal pattern 238*a*, a second lower terminal pattern 238*b*, a third lower terminal pattern 238*c*, a fourth lower terminal pattern 238*d*, a first upper terminal pattern 239*a*, a second upper terminal pattern 239*b*, a third upper terminal pattern 239*c*, and a fourth upper terminal pattern 239*d*.

The base sheet 231 is formed of a flexible substrate of a thin film such as a film, a sheet, or a thin film substrate. The base sheet 231 may be a flexible printed circuit board (FPCB). The base sheet 231 is, for example, a polypropylene (PP) sheet. Here, the base sheet 231 is not limited thereto, and may be variously used as long as it may be a thin film substrate and may form the antenna pattern 234 configuring the antenna.

The base sheet 231 is formed to have the area smaller than that of the magnetic sheet 210 and disposed on the upper surface of the magnetic sheet 210. The base sheet 231 is formed to have a half or less of the area of the magnetic sheet 210, and disposed on the upper surface of the magnetic sheet 210. The base sheet 231 is disposed to be tilted to one side of four sides of the magnetic sheet 210.

The terminal sheet 232 is formed such that the base sheet 231 extends outward from one side thereof. The terminal sheet 232 is the sheet on which terminal patterns are formed and formed to extend outward from one side, which is adjacent to the loop coil 220 and both ends of the antenna pattern 234 to be described later, of four sides the base sheet 231. Here, the terminal sheet 232 may be formed integrally with the base sheet 231, or formed separately therefrom, and then coupled to the base sheet 231.

The extension sheet 233 is formed to extend from the base sheet 231 toward the center of the loop coil 220. The extension sheet 233 is formed to extend from one side of the base sheet 231 to the direction in which the loop coil 220 is disposed (i.e., toward the center of the magnetic sheet 210). The extension sheet 233 may be configured to be formed integrally with the base sheet 231, or formed separately therefrom, and then coupled to the base sheet 231.

The extension sheet 233 forms the overlapping region with the loop coil 220. The extension sheet 233 forms the overlapping region with the region including the first end (RCE1) and the second end (RCE2) of the loop coil 220.

The antenna pattern 234 is formed on the upper surface of the base sheet 231. The antenna pattern 234 is formed in the loop shape in which a virtual winding axe perpendicular to the base sheet 231 is wound in plural times. The antenna pattern 234 is formed in the rectangular loop shape winding along four sides of the base sheet 231.

A first end of the antenna pattern 234 is disposed on the outer region of the loop formed by the antenna pattern 234. The first end of the antenna pattern 234 is electrically connected to the first upper terminal pattern 239*a* and the first lower terminal pattern 238*a* through a via hole.

A second end of the antenna pattern 234 is disposed on the inner region of the loop formed by the antenna pattern 234. The second end of the antenna pattern 234 is electrically connected to the second upper terminal pattern 239*b* and the second lower terminal pattern 238*b* through a via hole.

A part of the antenna pattern 234, which is disposed in the region adjacent to the extension sheet 233, is removed to form a penetration region (TA) through which the first connection pattern 236 and the second connection pattern 237 pass. That is, the first connection pattern 236 and the second connection pattern 237 are disposed from the base sheet 231 to the extension sheet 233 and thus are in contact with the antenna pattern 234. If the antenna pattern 234 is in contact with the connection pattern, the antenna characteristics may be changed. Therefore, the antenna pattern 234 disposed in the region through which the first connection pattern 236 and the second connection pattern 237 pass is removed to form the penetration region (TA).

The bypass pattern 235 is formed on the lower surface of the base sheet 231. The bypass pattern 235 is electrically connected to the antenna pattern 234 removed from the penetration region (TA). One end of the bypass pattern 235 is connected to a first cut-out part (CP1) of the antenna pattern 234 disposed on the left side of the penetration region (TA) through a via hole, and the other end of the bypass pattern 235 is connected to a second cut-out part (CP2) of the antenna pattern 234 disposed on the right side of the penetration region (TA) through a via hole. Therefore, the bypass pattern 235 forms a rectangular loop together with the antenna pattern 234.

The first connection pattern 236 is disposed over the upper surface of the base sheet 231 and the upper surface of the extension sheet 233. The first connection pattern 236 is disposed on the inner region of the rectangular loop formed by the antenna pattern 234 and the bypass pattern 235, the penetration region (TA), and the extension sheet 233 on the upper surface of the base sheet 231.

A first end (CP1E1) of the first connection pattern 236 is disposed on the extension sheet 233 and electrically connected to the first end (RCE1) of the loop coil 220. The first end (CP1E1) of the first connection pattern 236 is disposed in the region overlapping the first end (RCE1) of the loop coil 120 on the upper surface of the extension sheet 233. The first end (CP1E1) of the first connection pattern 236 is electrically connected to the first end (RCE1) of the loop coil 220 through soldering.

For example, a part of the extension sheet 233 is removed in the region in which the first end (CP1E1) of the first connection pattern 236 is disposed. The first end (CP1E1) of the first connection pattern 236 is exposed to the lower surface of the extension sheet 233 through the region where the extension sheet 233 is removed. By soldering the first end (RCE1) of the loop coil 220 with the first end (CP1E1) of the first connection pattern 236 exposed to the lower surface of the extension sheet 233, the first connection pattern 236 is electrically connected to the first end (RCE1) of the loop coil 220.

A second end (CP1E2) of the first connection pattern 236 is disposed on the inner region of the rectangular loop formed by the antenna pattern 234 and the bypass pattern 235. The second end (CP1E2) of the first connection pattern 236 is electrically connected to the third lower terminal pattern 238c. The second end (CP1E2) of the first connection pattern 236 is electrically connected to the third lower terminal pattern 238c through a via hole.

For example, the second end (CP1E2) of the first connection pattern 236 forms the overlapping region with the third lower terminal pattern 238c formed on the lower surface of the base sheet 231. The second end (CP1E2) of the first connection pattern 236 is electrically connected to the third lower terminal pattern 238c through a via hole formed in the overlapping region.

The second connection pattern 237 is disposed over the upper surface of the base sheet 231 and the upper surface of the extension sheet 233. The second connection pattern 237 is disposed in the inner region of the rectangular loop formed by the antenna pattern 234 and the bypass pattern 235, the penetration region (TA), and the extension sheet 233 on the upper surface of the base sheet 231.

A first end (CP2E1) of the second connection pattern 237 is disposed on the extension sheet 233 and electrically connected to the second end (RCE2) of the loop coil 220. The first end (CP2E1) of the second connection pattern 237 is disposed in the region overlapping the second end (RCE2) of the loop coil 220 on the upper surface of the extension sheet 233. The first end (CP2E1) of the second connection pattern 237 is electrically connected to the second end (RCE2) of the loop coil 220 through soldering.

For example, a part of the extension sheet 233 is removed in the region in which the first end (CP2E1) of the second connection pattern 237 is disposed. The first end (CP2E1) of the second connection pattern 237 is exposed to the lower surface of the extension sheet 233 through the region in which the extension sheet 233 is removed. By soldering the second end (RCE2) of the loop coil 220 with the first end (CP2E1) of the second connection pattern 237 exposed to the lower surface of the extension sheet 233, the second connection pattern 237 is electrically connected to the second end (RCE2) of the loop coil 220.

The second end (CP2E2) of the second connection pattern 237 is disposed on the inner region of the rectangular loop formed by the antenna pattern 234 and the bypass pattern 235. The second end (CP2E2) of the second connection pattern 237 is electrically connected to the fourth lower terminal pattern 238d. The second end (CP2E2) of the second connection pattern 237 is electrically connected to the fourth lower terminal pattern 238d through a via hole.

For example, the second end (CP2E2) of the second connection pattern 237 forms the overlapping region with the fourth lower terminal pattern 238d formed on the lower surface of the base sheet 231. The second end (CP2E2) of the second connection pattern 237 is electrically connected to the fourth lower terminal pattern 238d through a via hole formed in the overlapping region.

The first lower terminal pattern 238a to the fourth lower terminal pattern 238d are formed over the lower surface of the terminal sheet 232 and the lower surface of the base sheet 231. At this time, the first lower terminal pattern 238a to the fourth lower terminal pattern 238d are formed to be spaced apart from each other.

The first end of the first lower terminal pattern 238a is disposed on the terminal sheet 232. The first lower terminal pattern 238a is formed to extend from the first end toward the base sheet 231, and the second end of the first lower terminal pattern 238a is disposed on the lower surface of the base sheet 231.

At this time, the second end of the first lower terminal pattern 238a is disposed in the region overlapping with the first end of the antenna pattern 234 on the lower surface of the base sheet 231. The second end of the first lower terminal pattern 238a is electrically connected to the first end of the antenna pattern 234 through a via hole.

The first end of the second lower terminal pattern 238b is disposed on the terminal sheet 232. The second lower terminal pattern 238b is formed to extend from the first end toward the base sheet 231, and the second end of the second lower terminal pattern 238b is disposed on the lower surface of the base sheet 231.

At this time, the second end of the second lower terminal pattern 238b is disposed in the region overlapping the second end of the antenna pattern 234 on the lower surface of the base sheet 231. The second end of the second lower terminal pattern 238b is electrically connected to the second end of the antenna pattern 234 through a via hole.

The first end of the third lower terminal pattern 238c is disposed on the terminal sheet 232. The third lower terminal pattern 238c is formed to extend from the first end toward the base sheet 231, and the second end of the third lower terminal pattern 238c is disposed on the lower surface of the base sheet 231.

At this time, the second end of the third lower terminal pattern 238c is disposed in the region overlapping the second end (CP1E2) of the first connection pattern 236 on the lower surface of the base sheet 231. The second end of the third lower terminal pattern 238c is electrically connected to the second end (CP1E2) of the first connection pattern 236 through soldering.

The first end of the fourth lower terminal pattern 238d is disposed on the terminal sheet 232. The fourth lower terminal pattern 238d is formed to extend from the first end toward the base sheet 231, and the second end of the fourth lower terminal pattern 238d is disposed on the lower surface of the base sheet 231.

At this time, the second end of the fourth lower terminal pattern 238d is disposed in the region overlapping the second end (CP2E2) of the second connection pattern 237 on the lower surface of the base sheet 231. The second end of the fourth lower terminal pattern 238d is electrically connected to the second end (CP2E2) of the second connection pattern 237 through soldering.

The first upper terminal pattern 239a to the fourth upper terminal pattern 239d are formed on the upper surface of the terminal sheet 232. At this time, the first upper terminal pattern 239a to the fourth upper terminal pattern 239d are formed to be spaced apart from each other.

The first upper terminal pattern 239a is formed on the upper surface of the terminal sheet 232. The first upper terminal pattern 239a is formed on the lower surface of the terminal sheet 232, and overlaps a part of the first lower terminal pattern 238a. The first upper terminal pattern 239a is electrically connected to the first lower terminal pattern 238a through a via hole.

The second upper terminal pattern 239b is formed on the upper surface of the terminal sheet 232. The second upper terminal pattern 239b is formed on the lower surface of the terminal sheet 232, and overlaps a part of the second lower terminal pattern 238b. The second upper terminal pattern 239b is electrically connected to the second lower terminal pattern 238b through a via hole.

The third upper terminal pattern 239c is formed on the upper surface of the terminal sheet 232. The third upper terminal sheet 239c is formed on the lower surface of the terminal sheet 232, and overlaps a part of the third lower terminal pattern 238c. The third upper terminal pattern 239c is electrically connected to the third lower terminal pattern 238c through a via hole.

The fourth upper terminal pattern 239d is formed on the upper surface of the terminal sheet 232. The fourth upper terminal pattern 239d is formed on the lower surface of the terminal sheet 232, and overlaps a part of the fourth lower terminal pattern 238d. The fourth upper terminal pattern 239d is electrically connected to the fourth lower terminal pattern 238d through a via hole.

Meanwhile, referring to FIG. 16, the magnetic sheet 210 may be formed with a step compensation groove 212 for minimizing the increase in the thickness due to the overlapping between the loop coil 220 and the antenna sheet 230. The step compensation groove 212 is formed in the region overlapping the region in which the loop coil 220 and the antenna sheet 230 overlap in the magnetic sheet 210.

Referring to FIG. 17, the magnetic sheet 210 is formed of one sheet 214 (or film). The step compensation groove 212 is formed by etching the region overlapping the overlapping region between the loop coil 220 and the antenna sheet 230.

Referring to FIG. 18, the magnetic sheet 210 is configured by laminating a plurality of sheets 214 (or films). The step compensation groove 212 is formed by sequentially laminating a first sheet 214a and a second sheet 214b formed with a step compensation hole 216, and a third sheet 214c not formed with the hole. At this time, the first sheet 214a and the second sheet 214b are formed with the step compensation hole 216 having a predetermined shape by cutting the region overlapping the overlapping region between the loop coil 220 and the antenna sheet 230. If the magnetic sheet 210 has only the sheet 214, which is formed with the step compensation hole 216, laminated, the shielding performance is lowered, such that the magnetic sheet 210 is formed by laminating one or more sheets 214 not formed with the hole.

While the preferred exemplary embodiment of the present disclosure has been described above, it is understood that the present disclosure may be modified in various forms, and those skilled in the art may carry out various modified examples and changed examples without departing from the scope of the claims of the present disclosure.

The invention claimed is:

1. A combo antenna module comprising:
a magnetic sheet;
a loop coil disposed on an upper surface of the magnetic sheet;
an antenna sheet having an area smaller than an area of the magnetic sheet, and disposed on the upper surface of the magnetic sheet; and
a step compensation sheet having an area smaller than the area of the magnetic sheet and disposed on the upper surface of the magnetic sheet,
wherein the antenna sheet overlaps a part of the loop coil, and
wherein the step compensation sheet is made of a resin material and is disposed to cover a region not overlapping the antenna sheet on the upper surface of the magnetic sheet
wherein the antenna sheet comprises:
a flexible base sheet having an area smaller than the area of the magnetic sheet, and overlapping a region in which a first end and a second end of the loop coil are disposed;
an antenna pattern formed in a loop shape and disposed on an upper surface of the base sheet;
a first connection pattern disposed on the upper surface of the base sheet, and electrically connected to the first end of the loop coil; and
a second connection pattern spaced apart from the first connection pattern and disposed on the upper surface of the base sheet, and electrically connected to the second end of the loop coil, and
wherein the first connection pattern and the second connection pattern are disposed in an inner region of the loop formed by the antenna pattern.

2. The combo antenna module of claim 1,
wherein the loop coil is formed of a metal wire formed in a loop shape in which a virtual winding axe perpendicular to the magnetic sheet is wound by the loop coil in plural times.

3. The combo antenna module of claim 1,
wherein the antenna pattern overlaps a part of the loop coil.

4. The combo antenna module of claim 1,
wherein the first end and the second end of the loop coil overlap an inner region of the loop formed by the antenna pattern on a lower surface of the base sheet.

5. The combo antenna module of claim 1,
wherein a first end of the first connection pattern is exposed to a lower surface of the base sheet through a region in which a part of the base sheet is removed, and electrically connected to the first end of the loop coil in the region exposed to the lower surface of the base sheet.

6. The combo antenna module of claim 1,
wherein the first end of the second connection pattern is exposed to a lower surface of the base sheet through a region in which a part of the base sheet is removed, and electrically connected to the second end of the loop coil in the region exposed to the lower surface of the base sheet.

7. The combo antenna module of claim 1,
wherein the antenna sheet further comprises: a terminal sheet extending from one side of the base sheet, and formed with a plurality of terminal patterns.

8. The combo antenna module of claim 1,
wherein the magnetic sheet is formed with a step compensation groove in a region of overlapping the loop coil and the antenna sheet.

9. The combo antenna module of claim 8,
wherein the magnetic sheet is a laminate formed by laminating one or more sheets in which a hole is formed in the region of overlapping the loop coil and the antenna sheet.

\* \* \* \* \*